United States Patent
Moilanen et al.

(10) Patent No.: US 11,841,562 B1
(45) Date of Patent: Dec. 12, 2023

(54) ELECTRO-OPTIC MODULATION OF MULTIPLE PHASE MODULATOR WAVEGUIDES WITH A SINGLE ELECTRODE

(71) Applicant: Eospace Inc., Redmond, WA (US)

(72) Inventors: David Emil Moilanen, Bellevue, WA (US); Suwat Thaniyavarn, Bellevue, WA (US); Walter Charczenko, Woodinville, WA (US)

(73) Assignee: EOSPACE INC., Redmond, WA (US)

( * ) Notice: Subject to any disclaimer, the term of this patent is extended or adjusted under 35 U.S.C. 154(b) by 638 days.

(21) Appl. No.: 16/551,786

(22) Filed: Aug. 27, 2019

Related U.S. Application Data

(60) Provisional application No. 62/724,321, filed on Aug. 29, 2018.

(51) Int. Cl.
*G02F 1/035* (2006.01)
*G02F 1/03* (2006.01)

(52) U.S. Cl.
CPC ............ *G02F 1/0316* (2013.01); *G02F 1/035* (2013.01); *G02F 1/0356* (2013.01); *G02F 2202/20* (2013.01); *G02F 2203/50* (2013.01)

(58) Field of Classification Search
CPC .................................................. G02F 1/0356
See application file for complete search history.

(56) References Cited

U.S. PATENT DOCUMENTS

| | | | | |
|---|---|---|---|---|
| 2008/0170821 A1* | 7/2008 | Kissa | .................... | G02F 1/0316 385/14 |
| 2013/0315531 A1* | 11/2013 | Tamura | .................... | G02B 6/12 385/14 |
| 2015/0078701 A1* | 3/2015 | Takemura | ............. | G02F 1/0356 385/2 |
| 2015/0277156 A1* | 10/2015 | Kondou | ................ | G02F 1/0356 385/2 |
| 2016/0291351 A1* | 10/2016 | Kataoka | ................ | G02F 1/0356 |
| 2020/0041824 A1* | 2/2020 | Ohmori | .................... | G02F 1/225 |
| 2020/0174290 A1* | 6/2020 | Nikolov | ................ | G02F 1/0356 |
| 2022/0082876 A1* | 3/2022 | Sugiyama | ............... | G02F 1/035 |

FOREIGN PATENT DOCUMENTS

EP       1271220 A1 *  1/2003   ............. G02F 1/035

* cited by examiner

*Primary Examiner* — Eric Wong
(74) *Attorney, Agent, or Firm* — Cermak Nakajima & McGowan LLP; James Creighton Wray

(57) ABSTRACT

Electro-optic modulation of multiple phase modulator waveguides with a single electrode is made possible by determining places of equal electric field strength. Substrate extensions support edges of a wide hot electrode and ground electrodes equally spaced from the wide hot electrodes. Waveguides are positioned in the extensions separated from the electrodes by buffer layers. A wide microstrip hot electrode on a buffer layer, wider substrate and ground has multiple waveguides in the substrate below the buffer layer. A thinned substrate has a microstrip hot electrode and spaced coplanar grounds with multiple waveguides located on both sides. Decreasing substrate thickness flattens the electric field strength between the electrodes and allows multiple waveguides located between the central hot and outer ground electrodes. Adjacent waveguides with different asymmetric waveguide index portion staged along their length eliminate cross talk.

20 Claims, 16 Drawing Sheets

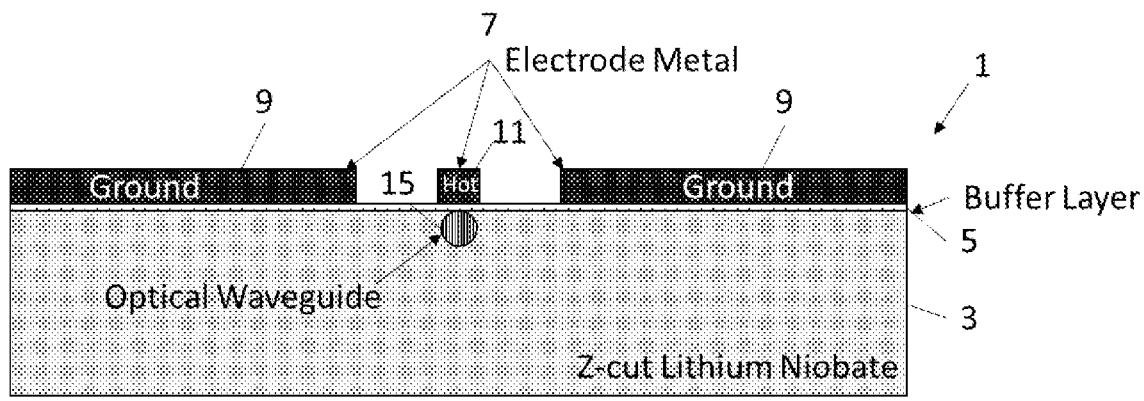
Figure 1 - PRIOR ART
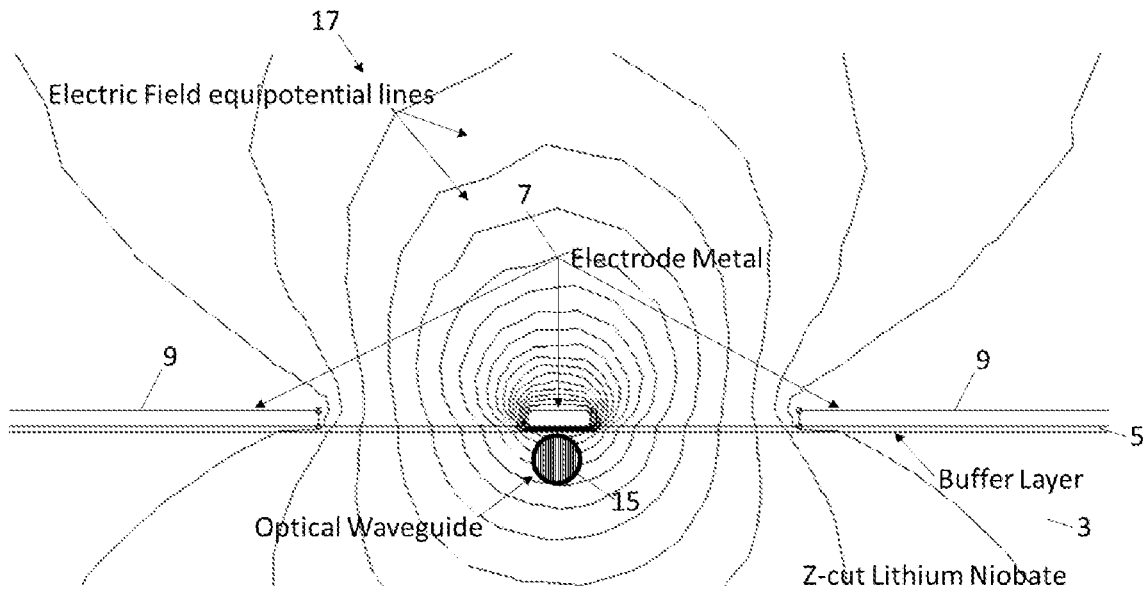
Figure 2 - PRIOR ART

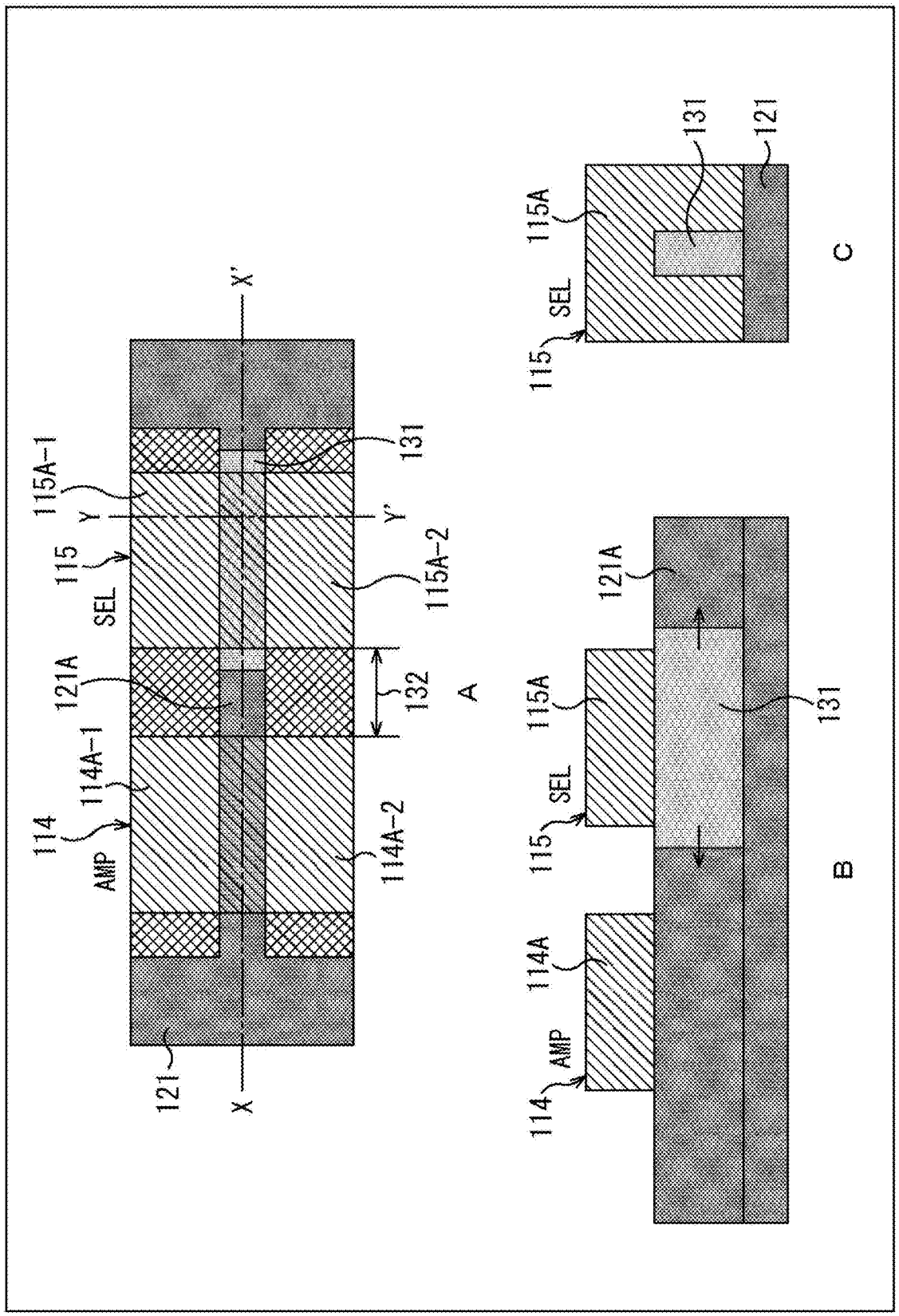

ELECTRO-OPTIC MODULATION OF MULTIPLE PHASE MODULATOR WAVEGUIDES WITH A SINGLE ELECTRODE

This application claims the benefit of U.S. Provisional Application No. 62/724,321 filed Aug. 29, 2018, which is hereby incorporated by reference in its entirety as if fully set forth herein.

BACKGROUND OF THE INVENTION

Electro-optic phase modulation is a common technique that is used in many applications including spectral broadening of narrow linewidth lasers. Often multiple optical channels must be spectrally broadened simultaneously. Prior art used a separate electro-optic phase modulator for each optical channel. An electro-optic phase modulator consists of an optical waveguide in an electro-optic material such as Lithium Niobate. An electric field produced by a suitable electrode structure that is patterned on the electro-optic material interacts with light in the optical waveguide and changes the index of refraction. A suitable electric waveform applied to the electrode structure results in optical broadening through electro-optic phase modulation. In many applications including linewidth broadening of narrow-linewidth lasers, there is a need for each optical channel to be modulated with a similar waveform.

Previous high-power laser systems utilized individual phase modulators (one electrode for each optical channel) to individually broaden each laser.

X-cut intensity modulators have two waveguides that are driven in a push-pull configuration and have very similar modulation strength in each waveguide. The modulation efficiency of these structures is typically lower for each waveguide and the prior art approach is not scalable beyond two waveguides.

SUMMARY OF THE INVENTION

This invention provides Electro-Optic phase modulation, High Power Lasers and Laser linewidth broadening. The invention applies to any application that requires multiple optical channels to be driven by the same waveform with similar or different modulation strength, using a single electrode structure requiring a single electrical drive signal (power).

Using high power laser systems as an example, the deficiency of previous high-power laser systems was that they used separate RF drivers and electro-optic phase modulators for each optical channel.

The current invention utilizes a single RF driver to modulate N optical channels. This results in an N-fold reduction in the size, weight, and power consumption of the RF drive electronics. The same benefit applies to any system that requires multiple optical channels to be modulated with the same electric waveform and similar modulation strength.

In this application a single electrode structure modulates multiple waveguides. There is significant reduction in the power consumption and space of the electronic driver circuits that produce the electric modulation waveform.

Optical linewidth broadening is important for high power laser applications. EOSPACE has won several SBIR awards over the past ten years from the Air Force to develop technology that advances the state-of-the-art in high power lasers for both Defense and commercial industrial applications. EOSPACE continues to explore novel techniques and designs that can benefit high power laser systems including the multi-channel phase modulation techniques described in this invention.

This invention describes examples of methods to achieve electro-optic modulation of multiple optical channels with a single electrode structure. Devices are created to achieve highly uniform modulation so that each optical channel experiences nearly the same modulation strength. Other devices have different modulation strengths for the optical channels. Uniform modulation is the most difficult to achieve. This description focuses on describing variations that achieve this goal, with the understanding that non-uniform modulation is a subset of these device structures. Lithium Niobate is an electro-optic material and will be used as an example to illustrate the designs and techniques to achieve electro-optic modulation of multiple optical channels. Any suitable electro-optic material may also be used with these designs to achieve a similar result.

There are a variety of applications that require that multiple optical channels are modulated with a similar electric waveform. One of these applications is power scaling of high-power laser systems. Optical linewidth broadening through electro-optic phase modulation can increase the Stimulated Brillouin Scattering (SBS) threshold of silica fiber and thereby increase the available output power of the laser. Another technique to increase the available output power of the laser is the combination of multiple different laser beams. This is commonly done in two different ways: spectral beam combining (SBC) uses a diffractive optical element to combine multiple different wavelengths of light, and coherent beam combining (CBC) matches the optical phase to combine multiple copies of the same light. The commonality between both techniques is the requirement of combining multiple optical channels. To increase the maximum optical power from each channel, every channel must be broadened to overcome the SBS threshold. The spectral broadening must be nearly identical for each channel to achieve the maximum SBS threshold and efficient beam combining. The requirement of multiple channels that are modulated with a nearly identical waveform requires a solution that involves an electro-optic modulator that can simultaneously modulate multiple optical channels with a single electrode structure. This invention describes devices and techniques to achieve this goal.

Electro-optic phase modulation for phase control and linewidth broadening has been used for many years in high power laser systems and other optical phased array applications. In prior art, each optical channel was driven and controlled by a separate optical modulator consisting of a single optical waveguide and an associated electrode structure to modulate the light in the waveguide. Electro-optic materials such as Lithium Niobate respond to an applied electric field with a change in the optical index of refraction. Every location in the material that experiences the same electric field strength will also experience the same change in the local optical index of refraction. This fact means that, if an electrode is designed such that it produces the same electric field strength in multiple locations in the material, it is possible to place optical waveguides at those locations and achieve the same electro-optic modulation in multiple waveguides simultaneously. This invention describes devices and techniques to achieve this goal in Z-cut and X-cut Lithium Niobate, but it is clear that similar designs will work in any electro-optic material. It is also possible to multiplex multiple wavelengths into a single optical waveguide and modulate them with a single electrode. Each approach to achieving phase modulation on multiple optical channels with a single electrode structure is described below.

Multi-Channel Phase Modulation in Z-Cut Lithium Niobate

The most common prior art implementation of an electro-optic phase modulator utilizes Z-cut Lithium Niobate. A single optical waveguide is placed under the center (hot) electrode of an electrode structure to create a field along the Z-axis of the Lithium Niobate. The electrode dimensions and buffer layer thickness are chosen to achieve the desired electrical impedance value and velocity matching between the optical and electrical waves.

The invention provides an electro-optic, multi-channel phase modulator of multiple phase optical waveguides configured for similar optical broadening of optical transmissions in multiple optical waveguides. The new electro-optic, multi-channel phase modulator includes an electro-optic material substrate and an electrode structure.

The electrode structure has a hot electrode positioned on the electro-optic material substrate and at least one ground electrode positioned on the electro-optic material substrate and spaced away from the hot electrode. Multiple optical waveguides are positioned on or in the electro-optic material substrate.

Each optical waveguide is positioned near the hot electrode or near the at least one ground electrode in one embodiment.

A source adapted for providing an electric signal is connected to the electrode structure and provides an electric field having varied magnitudes in different locations of the crystal. The electric field has multiple locations with similar magnitude. The multiple optical waveguides are positioned at the multiple locations of similar electric field magnitude.

In one embodiment the hot electrode is relatively wide. The at least one ground electrode is two relatively narrow ground electrodes that are equally spaced laterally from the hot electrode. Some of the optical waveguides are positioned near the relatively wide hot electrode, and some of the optical waveguides are positioned near the relatively narrow ground electrodes. Optical waveguides are positioned near the edges of the relatively wide hot electrode, and optical waveguides are positioned near the relatively narrow ground electrodes.

In one embodiment the electro-optic material substrate has central inner parallel ridges supporting edges of the relatively wide hot electrode. The electro-optic material substrate has outer parallel ridges supporting the ground electrodes. Optical waveguides are mounted in the central parallel ridges, near the edges of the relatively wide hot electrode. Other optical waveguides are mounted in the outer parallel ridges near the relatively narrow ground electrodes. Buffer layers are positioned between the edges of the relatively wide hot electrode and the adjacent optical waveguides, and buffer layers are positioned between the relatively narrow ground electrodes and their adjacent optical waveguides. All of the optical waveguides are positioned at locations of similar electric field magnitude.

In another embodiment the hot electrode is a wide hot electrode and the at least one ground electrode is a wide ground electrode. The electro-optical material substrate extends between the wide hot electrode and the wide ground electrode.

Multiple optical waveguides are mounted within the electro-optical material substrate between the wide hot electrode and the wide ground electrode, and closer to the wide hot electrode. A buffer layer extends between the multiple optical waveguides and the hot electrode.

In some embodiments the wide hot electrode is a microstrip electrode. As width of the microstrip electrode widens, numbers of possible optical waveguides increase.

In another embodiment the electro-optic material substrate is microns thin. The hot electrode is a central microstrip hot electrode. The at least one ground electrode comprises two microstrip ground electrodes. One microstrip ground electrode is positioned on either side and coplanar with the microstrip hot electrode in an area of flattened variance of the electric field strength between the microstrip hot electrode and the two microstrip ground electrodes. Increasing numbers of optical waveguides that may be used in that flattened area of electrical field strength between the hot electrode and the two ground electrodes.

In one embodiment adjacent waveguides have asymmetric waveguide indices, different widths and/or different diffusion parameters. Varying optical index along the lengths of the waveguides achieve the same propagation constant without optical coupling over the lengths.

These and further and other objects and features of the invention are apparent in the disclosure, which includes the above and ongoing written specification, with the claims and the drawings.

BRIEF DESCRIPTION OF THE DRAWINGS

FIG. 1 shows a prior art Z-cut Lithium Niobate electro-optic phase modulator.

FIG. 2 shows an electro-static simulation of the equipotential lines of the electric field distribution in a prior art Z-cut Lithium Niobate electro-optic phase modulator.

DETAILED DESCRIPTION

Figure 3:
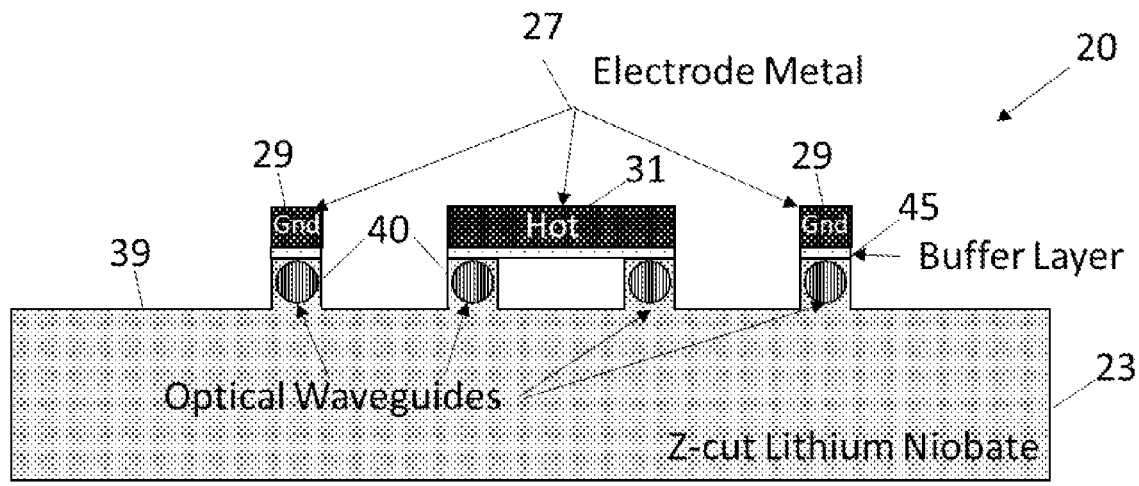
FIG. 3 shows an electrode and Z-cut Lithium Niobate substrate design to achieve uniform, efficient modulation in multiple optical waveguides.

FIG. 1 shows an illustration of a prior art single channel electro-optic phase modulator 1 in Z-cut Lithium Niobate 3 with a buffer layer 5 and electrode metal 7 including grounds 9 and hot electrode 11. The optical waveguide 15 is placed under the central (hot) electrode 11, so that it experiences the maximum electric field.

FIG. 2 shows an electro-static simulation of the equipotential lines 17 of the electric field distribution in a typical prior art Z-cut Lithium Niobate electro-optic phase modulator.

While it would be possible to place two waveguides symmetrically around the prior art central electrode structure, the electric field strength would be much lower resulting in inefficient modulation. Instead, the electrode structure as well as the Lithium Niobate substrate structure should be modified to achieve multiple regions of equipotential with large electric fields to achieve efficient modulation in multiple optical waveguides.

One possible embodiment for a multi-channel electro-optic phase modulator 20 in Z-cut Lithium Niobate 23 is shown in FIG. 3. The central hot electrode 31 is wider than the prior art design, and the ground electrodes 29 are narrower. The Lithium Niobate substrate 23 is no longer flat. The surface 39 of the Lithium Niobate is etched to form ridges 40 and the optical waveguides 41, 42, 43, 44 are located in these ridges. Buffer layer 45 separates the electrode metal 27 from the Lithium Niobate substrate ridges 40.

Figure 4:
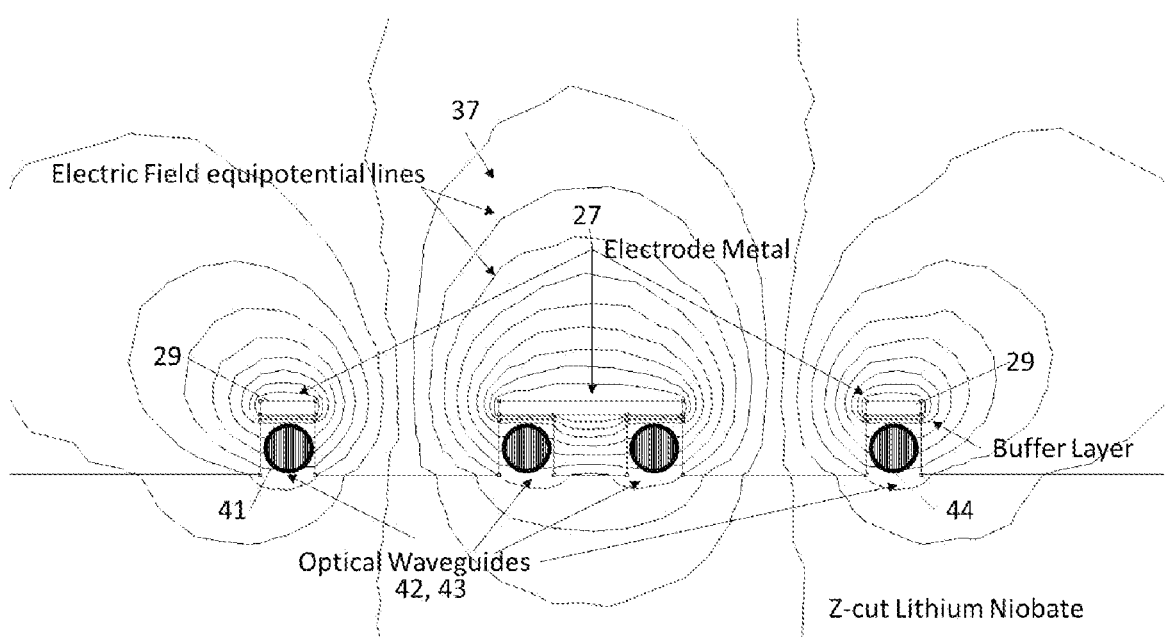
FIG. 4 shows an electro-static simulation of the equipotential lines of the electric field distribution in one example of the multi-channel phase modulator design that is implemented in Z-cut Lithium Niobate.
Figure 5:
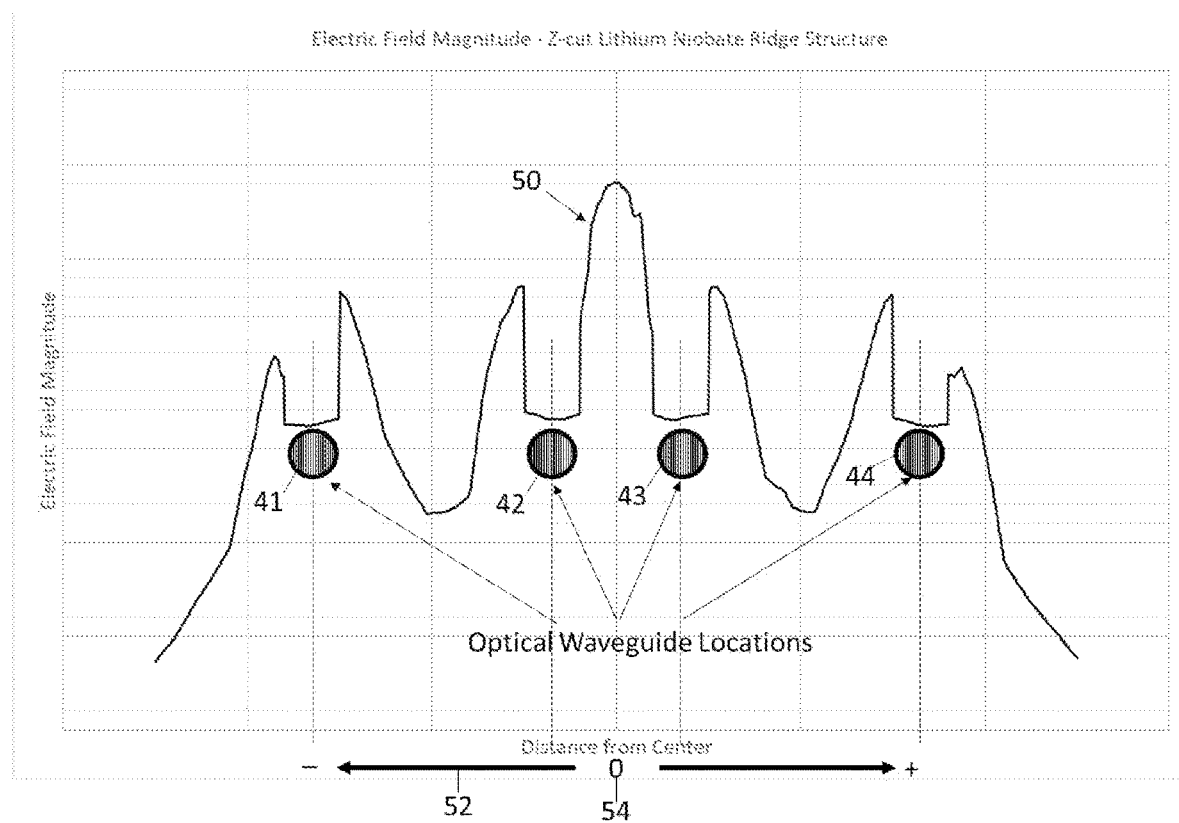
FIG. 5 shows the simulated electric field magnitude for the structure shown in FIG. 4 vs. distance from the center of the electrode structure. The locations of the waveguides are marked to illustrate how the electric field magnitude is very similar in all four of the waveguides.

The ridge structure enhances the electric field strength in the optical waveguide regions, and the dimensions of the hot and ground electrodes balances the electric field strength between the various optical waveguides to achieve very similar modulation efficiency in all the optical channels. In addition, the ridge structure significantly increases the optical waveguide confinement allowing a much tighter waveguide to waveguide spacing without introducing optical coupling. FIG. 4 shows the equipotential lines 37 from an electro-static simulation of this device structure. FIG. 5 shows the electric field magnitude 50 vs. distance 52 from the center 54 of the structure. The waveguide 41, 42, 43, 44 locations are marked on the graph as a guide to the eye. It is clear that the electric field magnitude is very similar in all four of the optical waveguide regions. Fine-tuning to achieve uniform electro-optic interaction for all channels can be easily accomplished by small adjustment of the relative positions of the waveguides with respect to the electrode structures, if a more exact modulation uniformity for all channels is required.

The example in FIGS. 2-5 illustrates a technique to scale the number of optical waveguides from one to four with a single electrode structure. By changing from a coplanar waveguide electrode structure to a microstrip electrode structure, larger numbers of optical waveguides can be modulated simultaneously.

Figure 6:
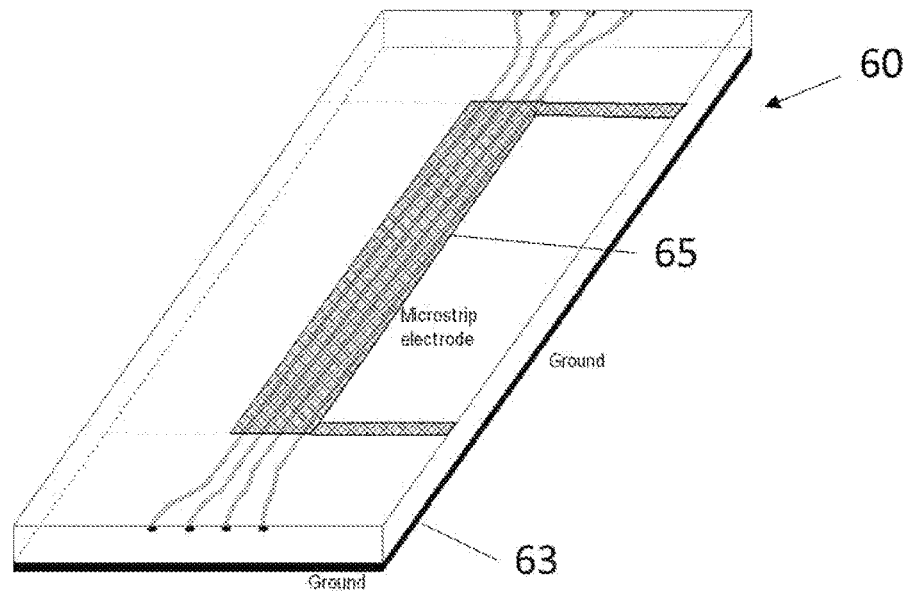
FIG. 6 shows a device design for a multi-channel phase modulator in Z-cut Lithium Niobate substrate with a wide ground that utilizes a wide microstrip electrode structure with multiple waveguides in the substrate under a buffer layer and a single electrode. The number of waveguides can be increased by increasing the width of the microstrip electrode.
Figure 7:
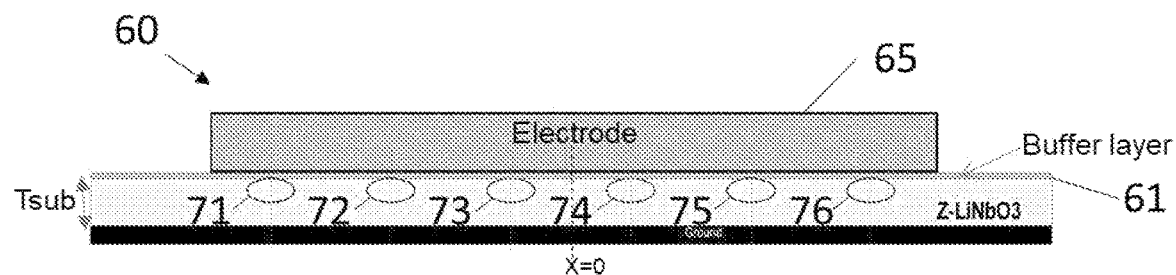
FIG. 7 shows a cross section of the device shown in FIG. 6 for a multi-channel phase modulator in Z-cut Lithium Niobate substrate that utilizes a microstrip electrode structure with multiple waveguides within the substrate under a buffer layer and a wide single electrode.

FIGS. 6 and 7 illustrate how a microstrip electrode structure 60 (+V applied to the top electrode 65 with the bottom electrode 63 at Ground) can be used to apply an electric field uniformly across multiple optical waveguides 71, 72, 73, 74, 75, 76. A buffer layer 61 prevents optical loading by the metal electrode. The number of optical waveguides is determined by the width of the top microstrip electrode 61 and the waveguide center-to-center spacing. Waveguide spacing is determined by the allowable level of optical crosstalk. As the width of the top microstrip electrode 65 increases, the range of locations that experience equivalent electric field strengths also increases.

Figure 8:
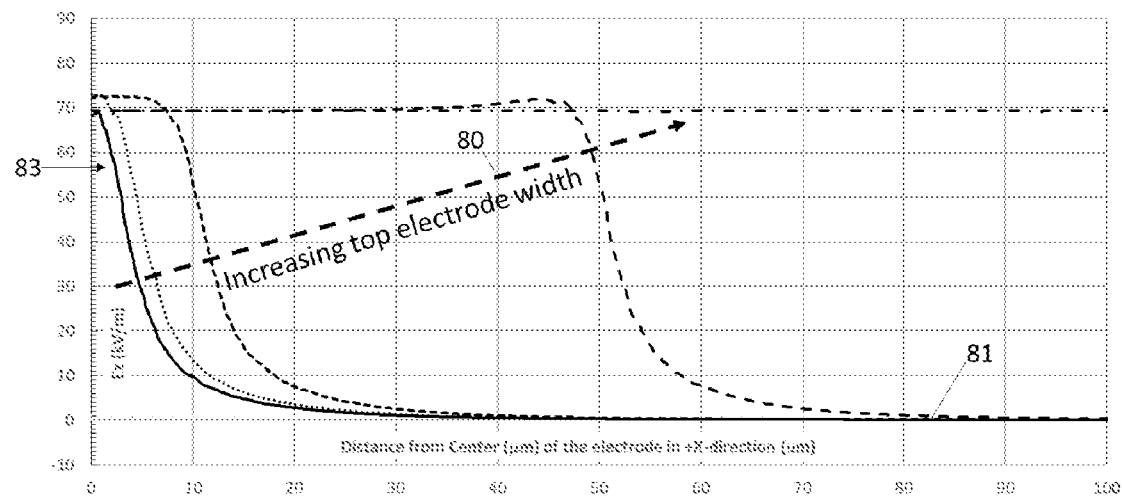
FIG. 8 shows electric field strength vs. distance from the center of the electrode for a microstrip electrode structure on 10 micron thick Z-cut Lithium Niobate. As the top electrode width increases, the electric field strength is uniform over a greater and greater distance.

FIG. 8 shows how increasing the top electrode width 80 eventually results in a flat electric field distribution 81 over a large range to allow the simultaneous modulation of multiple optical waveguides.

To achieve the highest modulation efficiency for this microstrip structure, the thickness of the Z-cut Lithium Niobate should be reduced. The electrostatic simulations 83 in FIG. 8 assume a substrate thickness of 10 microns.

Note that, for lower frequency operation, a simple "parallel-plate capacitive" electrode can be used for even larger numbers of optical channels.

Multi-Channel Phase Modulation in X-Cut Lithium Niobate

Prior art X-cut Lithium Niobate intensity modulators typically have a waveguide structure that is symmetric around a central electrode. The symmetry of this structure results in identical electric field strength in the two waveguides. While this prior art device structure could be utilized to achieve a two-channel phase modulator, the modulation efficiency of this structure is lower, and it cannot be extended to more than two channels with the same modulation strength.

Figure 9:
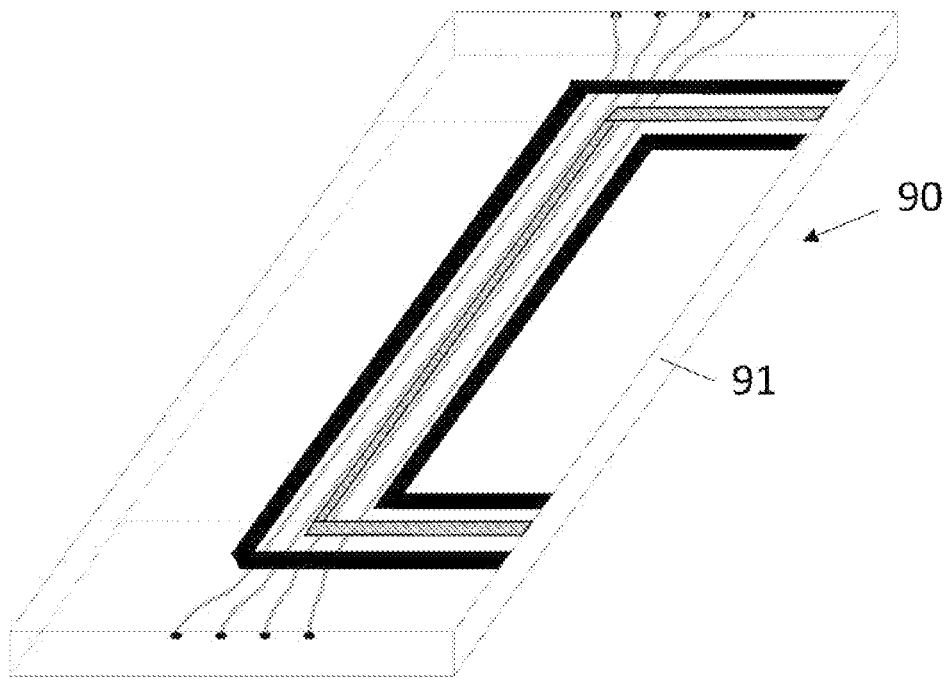
FIG. 9 shows a device design for a multi-channel phase modulator in X-cut Lithium Niobate that utilizes a coplanar waveguide electrode structure on a thinned Lithium Niobate substrate. Multiple waveguides are located on either side of the hot electrode.
Figure 10:
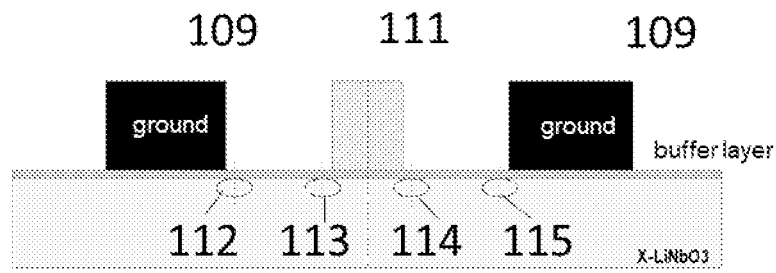
FIG. 10 shows a cross section of the device design for a four-channel phase modulator in thinned X-cut Lithium Niobate. Two waveguides are located near the edges of the central "hot" electrode and two more waveguides are located near the edge of the ground electrodes. A buffer layer (yellow) is necessary in this design to prevent optical loading effects by the metal electrodes.

While conventional prior-art X-cut structures are not compatible with multi-channel phase modulation, novel, efficient multi-channel phase modulator designs are possible. These designs utilize a thinned X-cut Lithium Niobate substrate with a coplanar waveguide style electrode structure. Conventional prior art X-cut modulators use Lithium Niobate substrates that are 500 microns thick or more. By thinning the substrate and adjusting the location of the optical waveguides, it is possible to achieve efficient modulation in four optical waveguides. FIGS. 9 and 10 illustrate the design of a four-channel phase modulator 90 in thinned X-cut Lithium Niobate 91.

In FIG. 10, the optical waveguides 112, 113, 114, 115 are placed near the edges of the central "hot" electrode 111 and the edges of the ground electrodes 109. These locations result in a slight electric field enhancement to improve the modulation efficiency.

Figure 11:
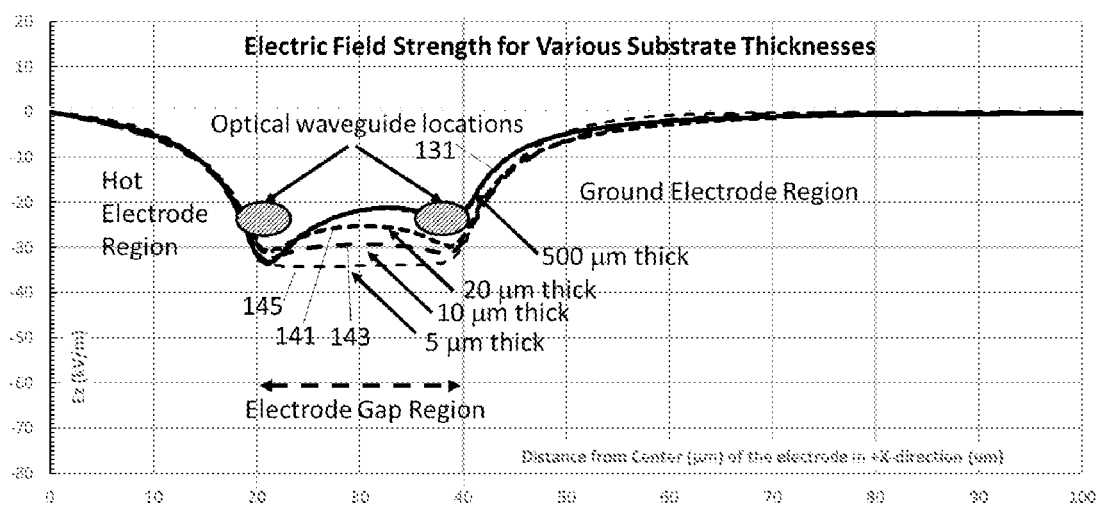
FIG. 11 shows electric field strength for various substrate thicknesses of the X-cut Lithium Niobate device structure shown in FIGS. 9 and 10. The locations of the optical waveguides are shown as red ellipses to illustrate the effective electric field strength for two of the waveguides. The symmetry of the device structure means that the electric field strength in the other two waveguides will be identical.
Figure 12:
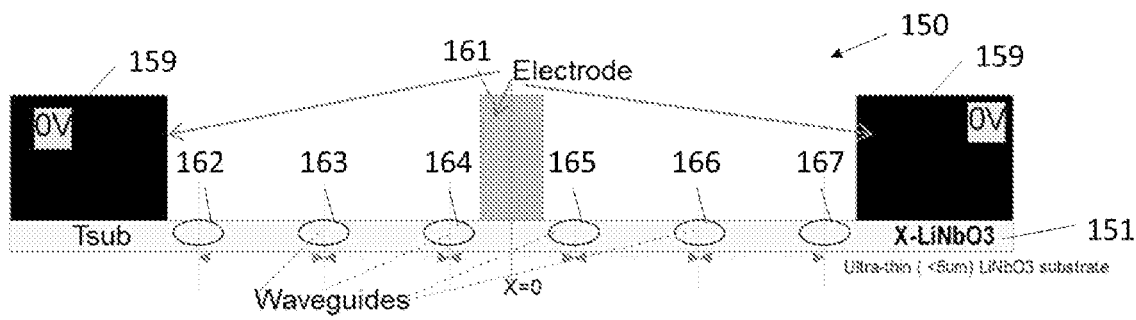
FIG. 12 shows a cross section of the device design for a multi-channel phase modulator in ultra-thin X-cut Lithium Niobate that utilizes a coplanar waveguide electrode structure with multiple waveguides located between the central hot and the outer ground electrodes.

In conventional, full thickness device structures, the waveguides closest to the hot electrode will experience a stronger electric field (black trace 131 in FIG. 11). As the substrate thickness is reduced, the electric field strength becomes more uniform at the edges of the electrode gap so that for substrate thicknesses less than 20 microns (dashed trace 141 in FIG. 11) the electric field strength at the edges is effectively equal. A substrate thickness of ~20 microns is relatively easy to achieve with high yield, making this four-channel device structure useful. When the substrate thickness is reduced to 10 microns (dashed trace 143 in FIG. 11), the electric field begins to flatten. When the substrate thickness is reduced to 5 microns (dashed trace 145 in FIG. 11), the electric field strength becomes nearly flat across the electrode gap region. This means that waveguides can be placed at any location between the hot and ground electrodes and will experience the same modulation strength. Moving the waveguides away from the edges of the electrodes also means that it is possible to eliminate the optical buffer layer. This results in further electric field enhancement in the thinned substrate region. FIG. 12 shows an example cross section 150 of this ultra-thin X-cut Lithium Niobate 151 with no buffer layer.

Figure 13:
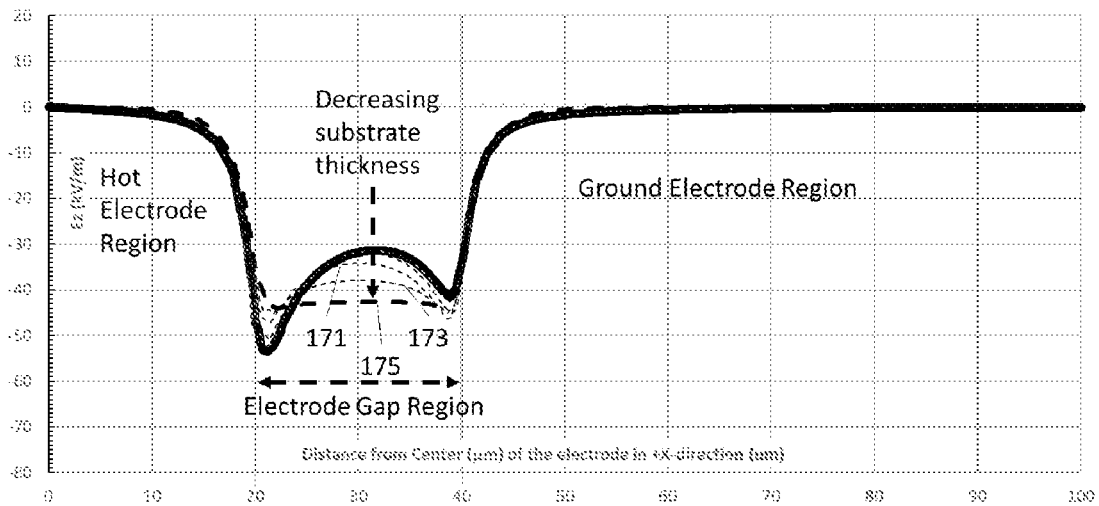
FIG. 13 shows electric field strength vs. distance from the center of the electrode for a coplanar waveguide electrode structure on ultra-thin X-cut Lithium Niobate (with no buffer layer). As the thickness of the substrate decreases, the electric field strength becomes more uniform in the electrode gap region.

Multiple waveguides 162-167 can be located in the gap regions on either side of the central hot electrode 161. Increasing the electrode gap (distance between the hot and ground electrodes 159) allows larger numbers of waveguides. Electrostatic simulations of the electric field strength 170 in the electrode gap region 179 of a thinned X-cut Lithium Niobate structure with no buffer layer at different Lithium Niobate substrate thicknesses 20, 10 and 5 microns are shown at 171, 173 and 175, respectively, in FIG. 13. Note the flatness of the electric field strength for the trace 175 in FIG. 13, indicating that all optical waveguides located in the gap region will all experience the same electric field strength.

The number of optical waveguides that can be placed in the gap between the hot and ground electrodes depends on the allowable optical crosstalk level and the desired modulation efficiency. Increasing the gap between the hot and ground electrodes provides more space for waveguides but will result in a lower electric field strength. The field uniformity is still maintained for larger electrode gaps.

Figure 14:
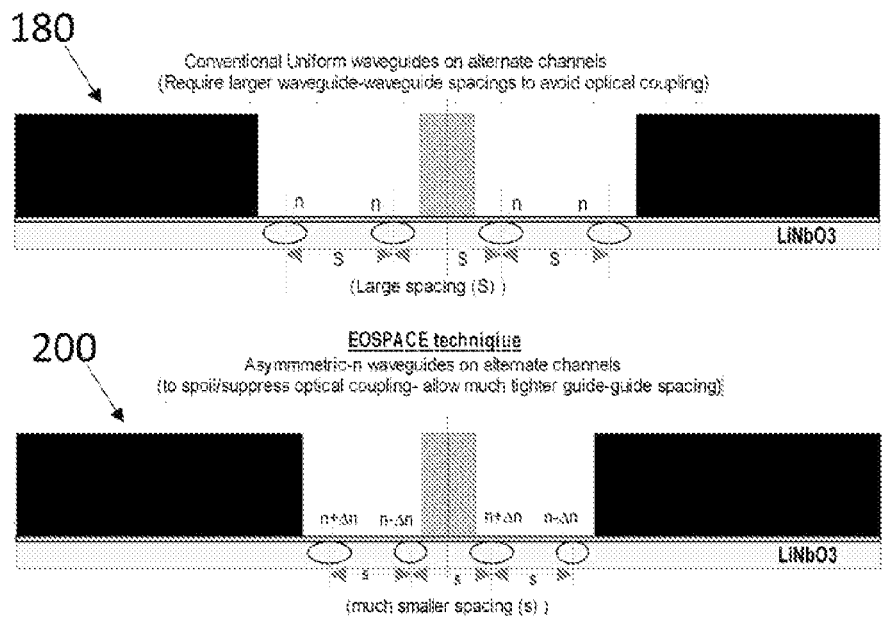
FIG. 14 shows a comparison of conventional uniform waveguides and EOSPACE's patented asymmetric index waveguides. The asymmetric index waveguides can have a much smaller center-to-center spacing while still maintaining low optical coupling (crosstalk).

Another technique to reduce the spacing between the optical waveguides and thereby increase the number of optical channels that can fit in the electrode gap region is to utilize EOSPACE's patented asymmetric index waveguides FIG. 14 shows a comparison of conventional uniform waveguides and EOSPACE's asymmetric index waveguides. Conventional waveguides 180 must be separated by a larger distance to avoid optical coupling. EOSPACE asymmetric index waveguides 200 can be placed much closer together, because optical coupling is suppressed by the imperfect mode matching between adjacent waveguides. Since the optical index is different in adjacent waveguides, coupling is suppressed because the optical propagation constants do not match.

Figure 15:
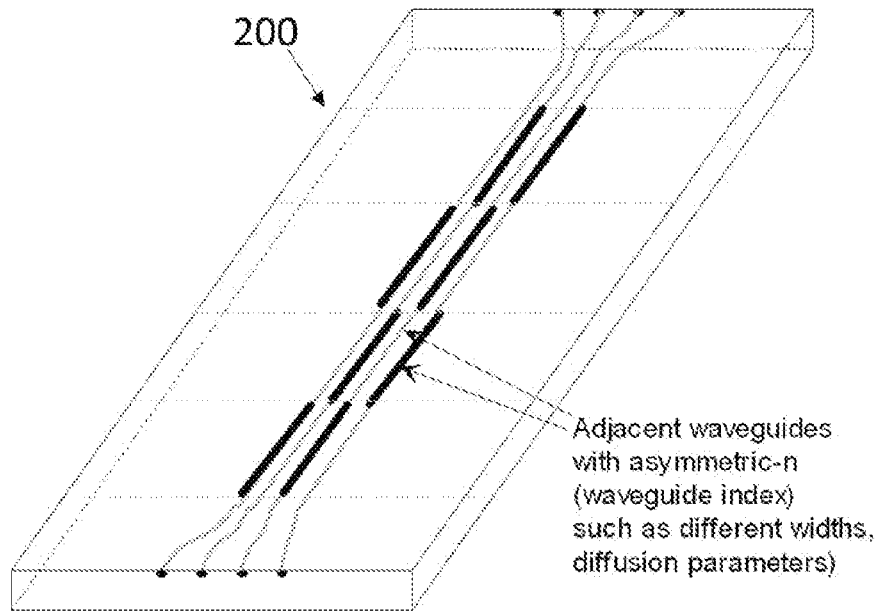
FIG. 15 shows an illustration of asymmetric index waveguides with index variation along the length of the waveguide. By varying the optical index along the length of the waveguide, it is possible to achieve the same overall propagation constant while spoiling the optical coupling over the entire length of the device.

The optical index of each optical waveguide can be varied along its length by changing the waveguide width or other parameters. This allows the overall propagation speed of the waveguides to be matched while locally spoiling the coupling between adjacent waveguides. FIG. 15 shows an illustration of EOSPACE asymmetric index waveguides 200 that have index variation along their length. In each region, the optical index of adjacent waveguides is different to prevent optical coupling/crosstalk, but over the entire length, the average index of each waveguide is the same.

Wavelength Division Multiplexing for Multi-Channel Phase Modulation

Figure 16:
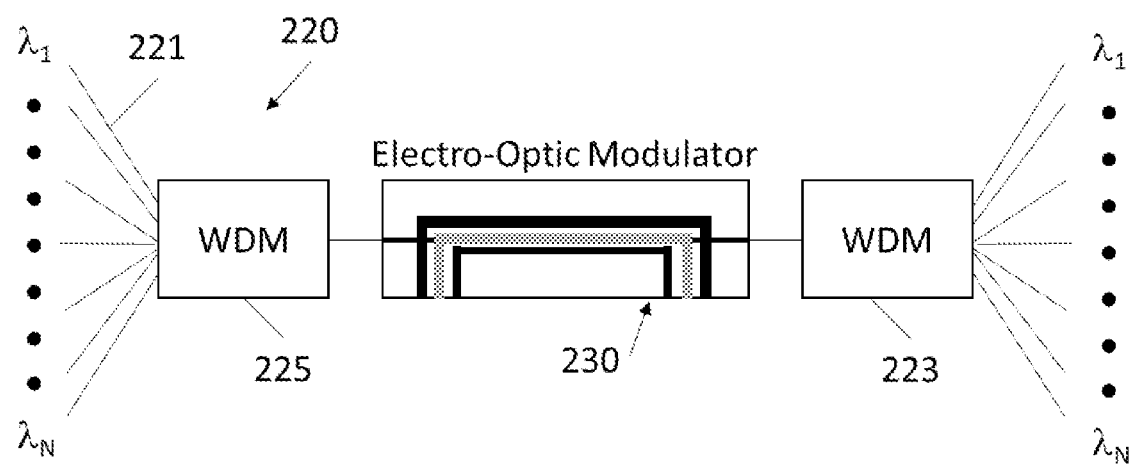
FIG. 16 shows wavelength division multiplexing of multiple wavelengths into a single optical waveguide that is modulated by a single electrode structure. After modulation, the wavelengths can be demultiplexed.
Figure 17:
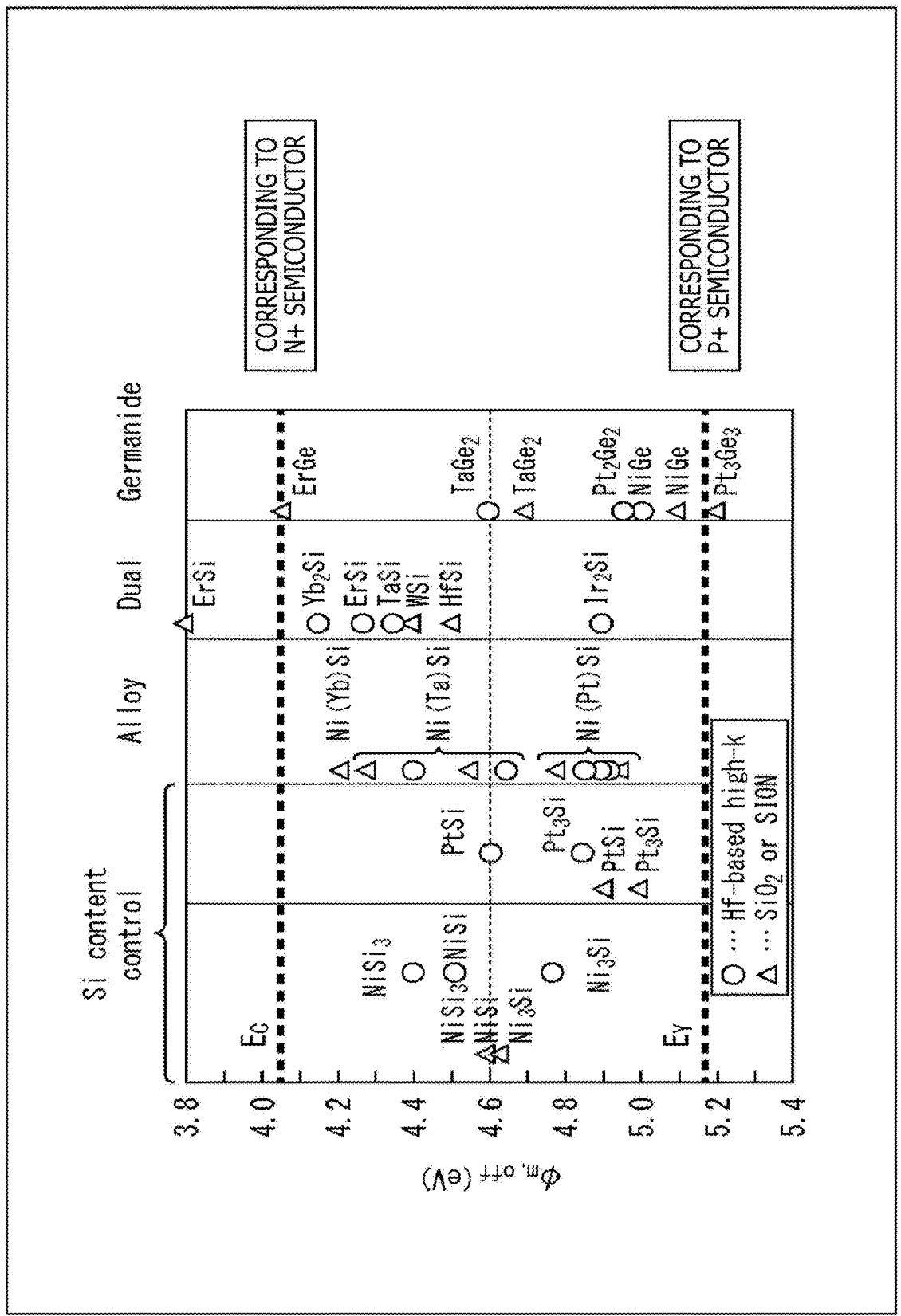
Figure 18:
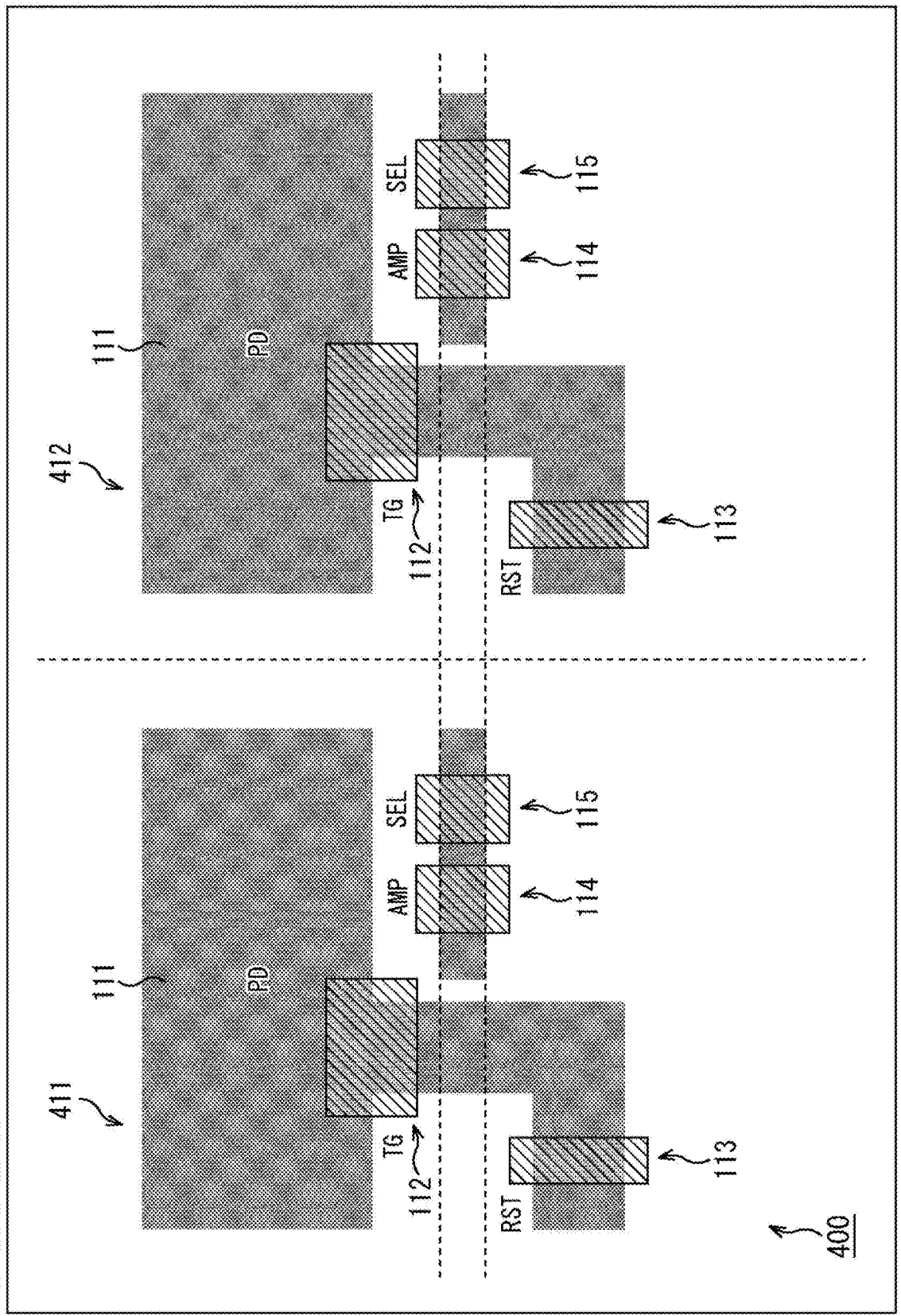
Figure 19:
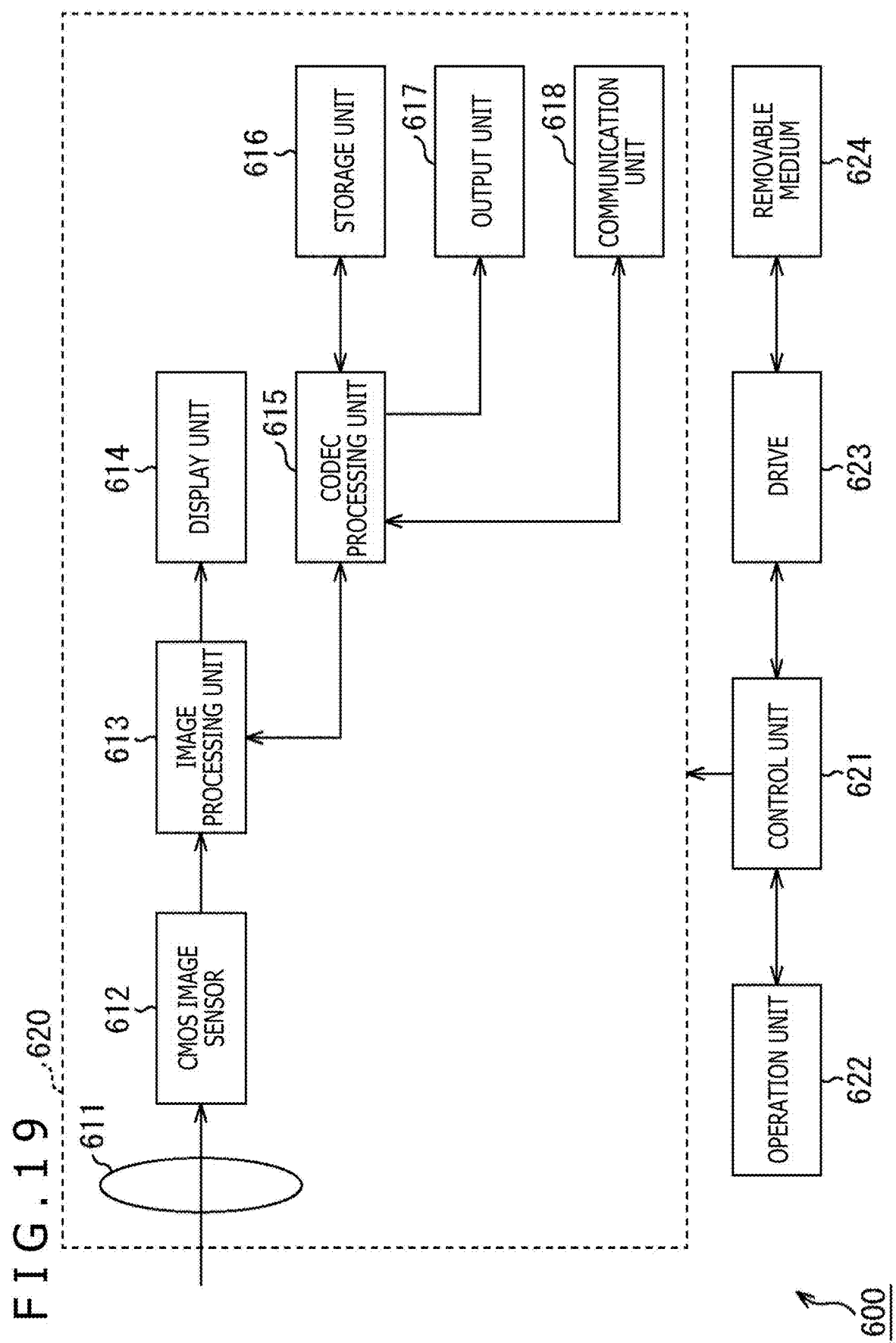
Figure 20:
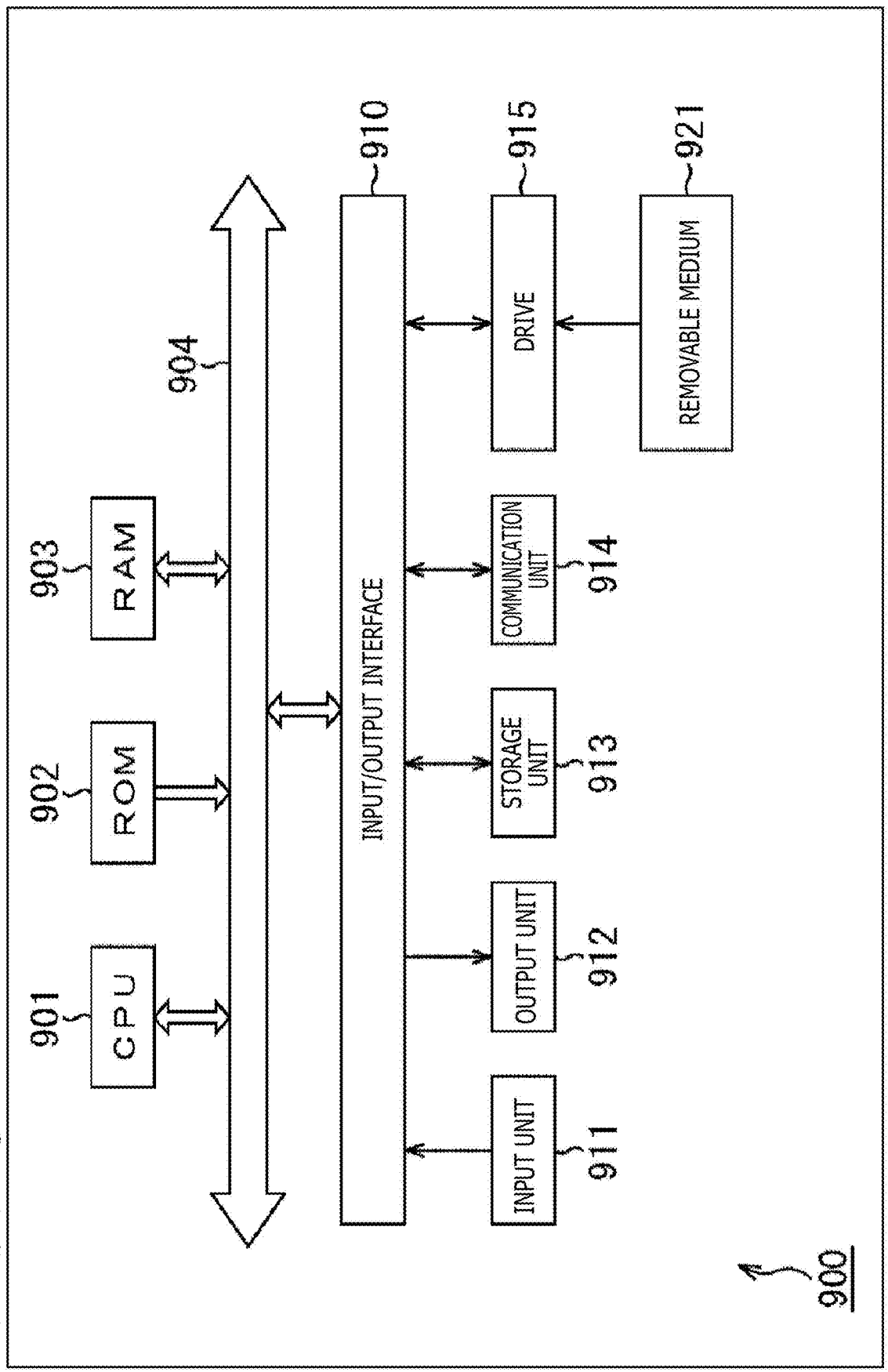
Figure 21:
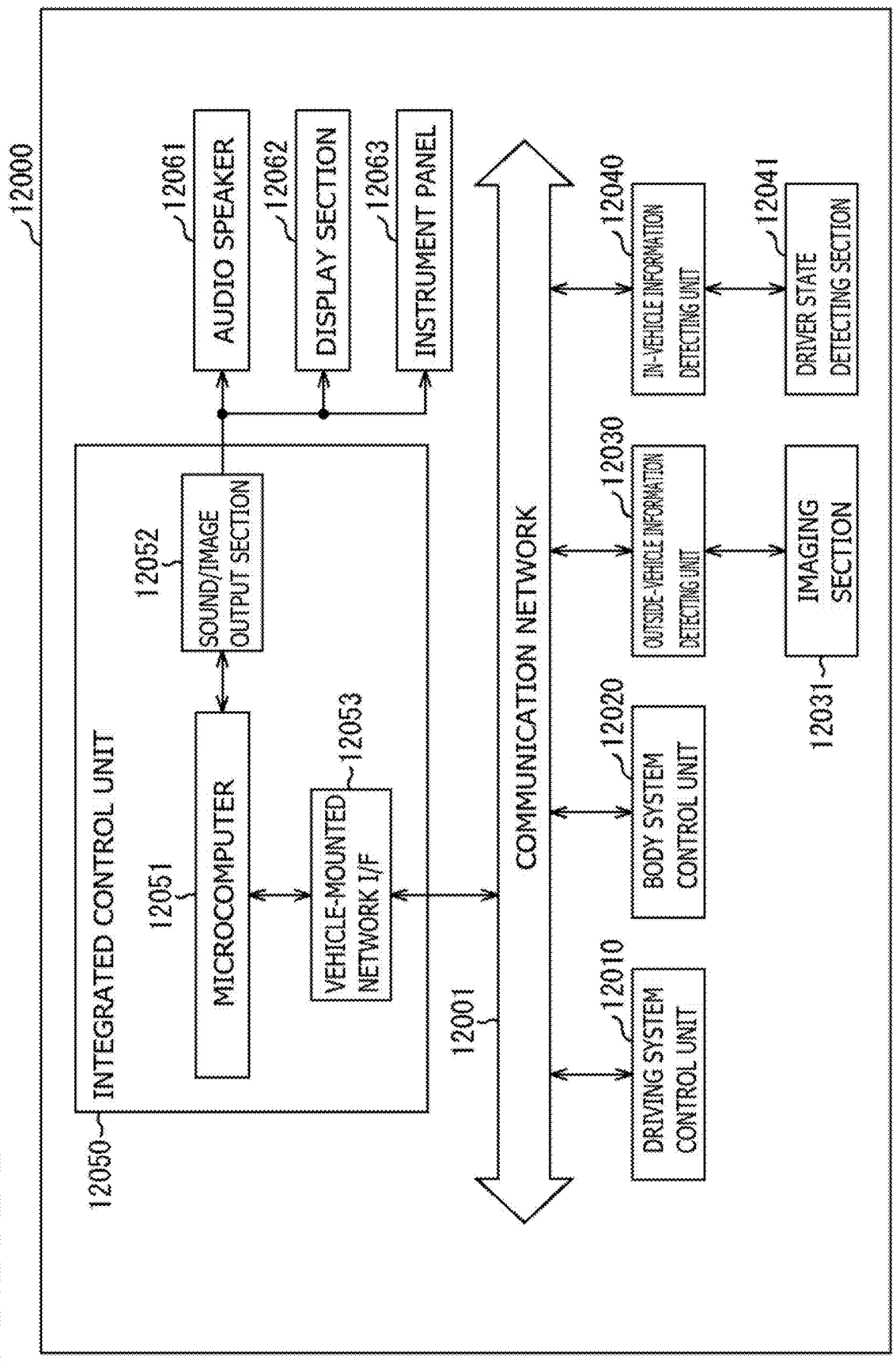
Figure 22:
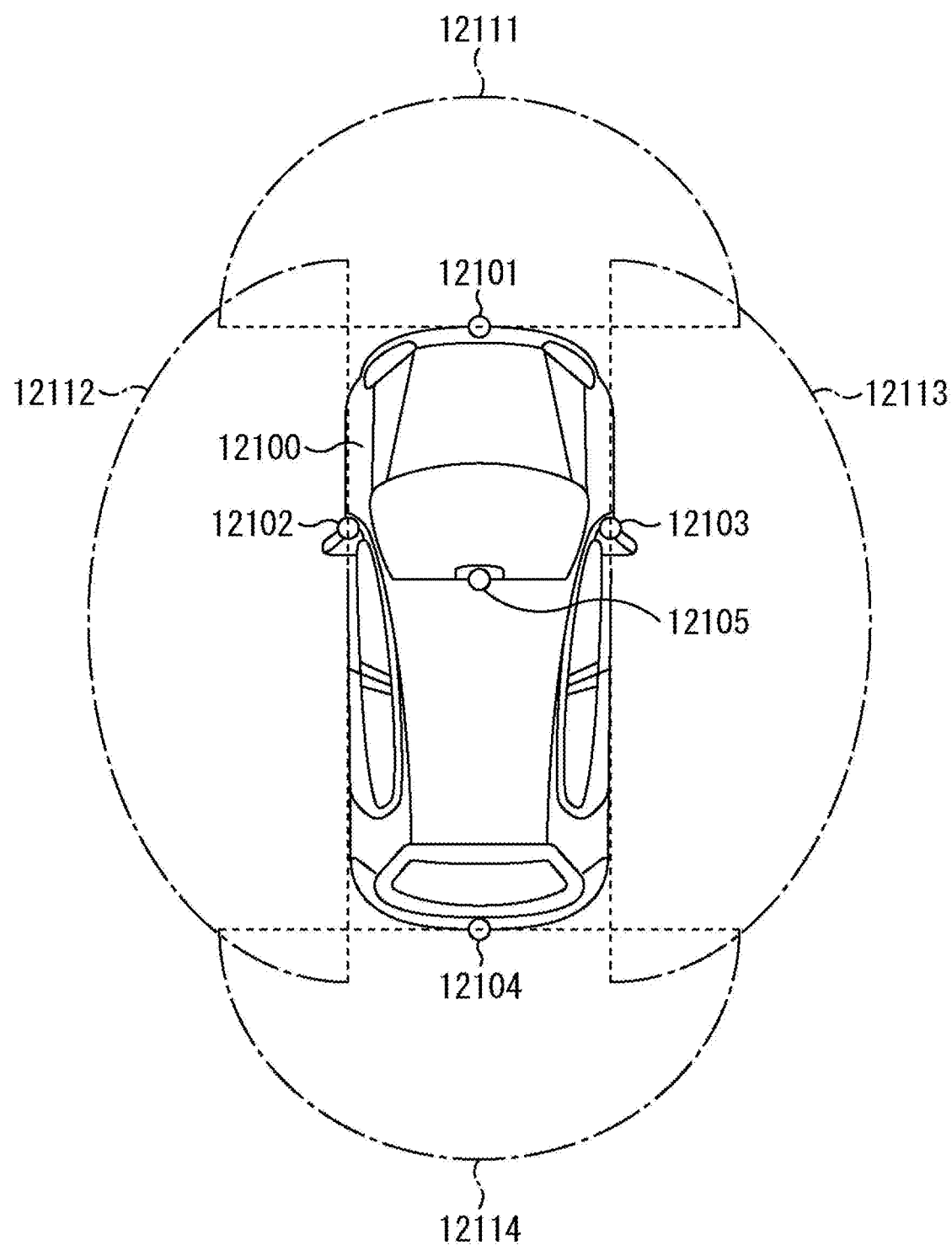

Up to this point, the preferred embodiments of this invention have focused on spatially separated optical waveguides that experience similar electric fields due to novel electrode designs or electro-optic substrate modifications. It is also possible, as shown in FIG. 16, to achieve similar electro-optic modulation onto multiple optical channels by utilizing wavelength division multiplexing 220 (WDM) of many wavelengths 221 into a single optical waveguide 230, as shown in FIG. 9. The various wavelengths can be multiplexed 223, 225 using a variety of means including array waveguide grating (AWG) structures or diffractive optical elements (DOE). Array waveguide grating structures can be designed to have a flat-top response with good channel isolation around each of the wavelengths so that crosstalk between optical channels is still low after the light has been modulated by the applied electric field waveform. Diffractive optical elements are commonly used in high power laser systems based on spectral beam combining to multiplex spectrally broadened wavelengths into a high-power output beam. This multi-channel modulation technique is not as general as those described earlier because it only works when multiple wavelengths are present, and the multiple wavelengths must be chosen to match the channels of the AWG or the characteristics of the DOE. However, when these conditions are met, this design is compatible with existing electro-optic modulators.

While the invention has been described with reference to specific embodiments, modifications and variations of the invention may be constructed without departing from the scope of the invention, which is defined in the following claims.

We claim:

1. Apparatus comprising an electro-optic, multi-channel phase modulator of multiple phase optical waveguides configured for similar optical broadening of optical transmissions in multiple optical waveguides;

the electro-optic, multi-channel phase modulator further comprising:
an lithium niobate substrate with a thickness of less than 10 microns; and
an electrode structure;
the electrode structure comprising:
a hot electrode positioned on the electro-optic material substrate;
at least one ground electrode positioned on the electro-optic material substrate; and
multiple optical waveguides positioned and evenly spaced on or in the electro-optic material substrate;
wherein the ground electrode is relatively narrower than the hot electrode;
a source adapted for providing an electric wave form applied to the electrode structure;

thereby providing an electric field having varied magnitudes;

the electric field having multiple locations of similar electric field magnitudes;

the multiple optical waveguides being positioned at the multiple locations of the similar electric field magnitudes, wherein the waveguides have a center-to-center spacing sufficient to prevent optical coupling between waveguides.

2. The apparatus of claim 1, comprising two ground electrodes wherein the two ground electrodes are each relatively narrower than the hot electrode, and are equally spaced laterally from the hot electrode.

3. The apparatus of claim 2, wherein the width of the hot electrode is narrower than the center-to-center waveguide spacing.

4. The apparatus of claim 1, wherein the ground electrodes are spaced at least one waveguide center-to-center spacing from the edge of the hot electrode.

5. The apparatus of claim 1, wherein the substrate has central parallel ridges supporting the edges of the hot electrode and the substrate has outer parallel ridges supporting the ground electrodes, and wherein first and second optical waveguides are mounted in the central parallel ridges, and third and fourth optical waveguides are mounted in the outer parallel ridges near the ground electrodes.

6. The apparatus of claim 5, further comprising first and second buffer layers positioned between the hot electrode and the first and second optical waveguides, and third and fourth buffer layers positioned between the ground electrodes and the third and fourth optical waveguides.

7. The apparatus of claim 1,
wherein the substrate extends between the electrode and the ground electrode;
and wherein the multiple optical waveguides are mounted within the substrate between the hot electrode and the ground electrode;
and further comprising a buffer layer which extends between the multiple optical waveguides and the hot electrode.

8. The apparatus of claim 7, wherein the hot electrode is a microstrip electrode.

9. The apparatus of claim 1, wherein the electrodes are disposed directly on the substrate.

10. The apparatus of claim 1, wherein lithium niobate substrate is about 5 microns thick.

11. A method comprising providing an electro-optic, multi-channel phase modulator of multiple phase optical waveguides configured for similar optical broadening of optical transmissions in multiple optical waveguides;
providing lithium niobate substrate with a thickness of less than ten microns on the electro-optic, multi-channel phase modulator further comprising:
providing an electrode structure in or on the substrate, wherein providing the electrode structure further comprises providing a hot electrode positioned on the substrate;
providing at least one ground electrode positioned on the substrate and spaced away from the hot electrode, wherein the ground electrode is relatively narrower than the hot electrode;
providing multiple optical waveguides positioned on or in the substrate;
positioning each optical waveguide near the hot electrode or near the at least one ground electrode;
providing an electric wave form, applying the electric wave form to the electrode structure in or on the substrate,
thereby providing an electric field having varied magnitudes;
providing multiple locations of similar electric field magnitudes; and
positioning the multiple optical waveguides at the multiple locations of the similar electric field magnitudes.

12. The method of claim 11, wherein the ground electrodes are placed equidistant laterally from the hot electrode.

13. The method of claim 12, wherein the optical waveguides are evenly positioned on or in the substrate.

14. The method of claim 13, further comprising positioning first and second optical waveguides near edges of the hot electrode, and third and fourth optical waveguides near the relatively narrow ground electrodes.

15. The method of claim 14, further comprising providing inner parallel ridges of the lithium niobate substrate inner parallel ridges supporting edges of the hot electrode on the inner parallel ridges and the electro-optic material substrate, providing outer parallel ridges on the electro-optic material substrate and supporting the ground electrodes on the outer parallel ridges and mounting first and second optical waveguides in the inner parallel ridges near the edges of the hot electrode, and mounting third and fourth optical waveguides in the outer parallel ridges near the ground electrodes, and further comprising providing buffer layers between the edges of the hot electrode and the first and second optical waveguides, and third and fourth buffer layers positioned between the ground electrodes and the third and fourth optical waveguides.

16. The method of claim 11, further comprising providing the optical waveguides at the locations of the similar electrical field magnitudes.

17. The method of claim 11,
wherein the providing the electro-optical material substrate comprises extending the electro-optical material substrate between the hot electrode and the ground electrode;
and wherein the providing the multiple optical waveguides comprises mounting the multiple optical waveguides within the electro-optical material substrate between the hot electrode and the ground electrode, and closer to the hot electrode;
and further comprising providing a buffer layer extending between the multiple optical waveguides and the hot electrode.

18. The method of claim 17, wherein the providing the hot electrode comprises providing a microstrip electrode.

19. The method of claim 18, wherein widening of the microstrip electrode providing increasing possible numbers of the multiple optical waveguides.

20. The method of claim 11, wherein the providing of the electro-optic material substrate comprises providing a 5 microns-thin electro-optic material substrate, wherein providing the hot electrode comprises providing a microstrip hot electrode, and providing the at least one ground electrode comprises providing two microstrip ground electrodes, and providing one microstrip ground electrode on either side and coplanar with the microstrip hot electrode, thereby avoiding any variance of the electric field strength between the microstrip hot electrode and the two microstrip ground electrodes, and increasing numbers of optical waveguides that may be used there between.

* * * * *